(12) United States Patent
Yang

(10) Patent No.: US 6,664,758 B2
(45) Date of Patent: *Dec. 16, 2003

(54) UNIVERSAL POWER ADAPTER

(76) Inventor: Fu-I Yang, 5th Floor, Hsin Pu 8th Street, TaoYuan City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/108,487

(22) Filed: Mar. 29, 2002

(65) Prior Publication Data

US 2003/0184259 A1 Oct. 2, 2003

(51) Int. Cl.[7] .................................................. H02J 7/00
(52) U.S. Cl. ....................................................... 320/107
(58) Field of Search ................................. 320/107, 105, 320/111, 112, 113, 114, 115, 128, 134, 161, 162, 163, 164; 323/268, 270, 273, 281; 363/144, 146, 147; 361/64, 93.1, 67, 681; 307/31, 38, 39, 42

(56) References Cited

U.S. PATENT DOCUMENTS

| | | | | |
|---|---|---|---|---|
| 6,211,649 B1 | * | 4/2001 | Matsuda | 320/115 |
| 6,255,800 B1 | * | 7/2001 | Bork | 320/115 |
| 6,282,082 B1 | * | 8/2001 | Armitage et al. | 361/681 |
| 6,362,610 B1 | * | 3/2002 | Yang | 323/281 |
| 6,396,137 B1 | * | 5/2002 | Klughart | 257/691 |
| 6,439,464 B1 | * | 8/2002 | Fruhauf et al. | 235/492 |
| 6,507,172 B2 | * | 1/2003 | Sherman | 320/134 |
| 6,509,657 B1 | * | 1/2003 | Wong et al. | 307/66 |

* cited by examiner

Primary Examiner—Pia Tibbits
(74) Attorney, Agent, or Firm—Rosenberg, Klein & Lee

(57) ABSTRACT

An universal power adapter is constructed to include a power input connector, the power input connector having a voltage regulator adapted to automatically regulate the voltage of input current, the voltage regulator including a power/signal jack for connection to the charging connector, a DC voltage converter adapted to convert input current into the desired voltage level and then transmit the voltage-converted input current to the power/signal jack, and a feedback control voltage output circuit adapted to drive the DC voltage converter to output a predetermined voltage subject to compare the feedback voltage signal obtained from the power/signal jack, and a charging connector, which includes a power/signal connecting connector at one end of the power cord thereof for connection to the power/signal jack and a voltage parameter preset therein.

1 Claim, 6 Drawing Sheets

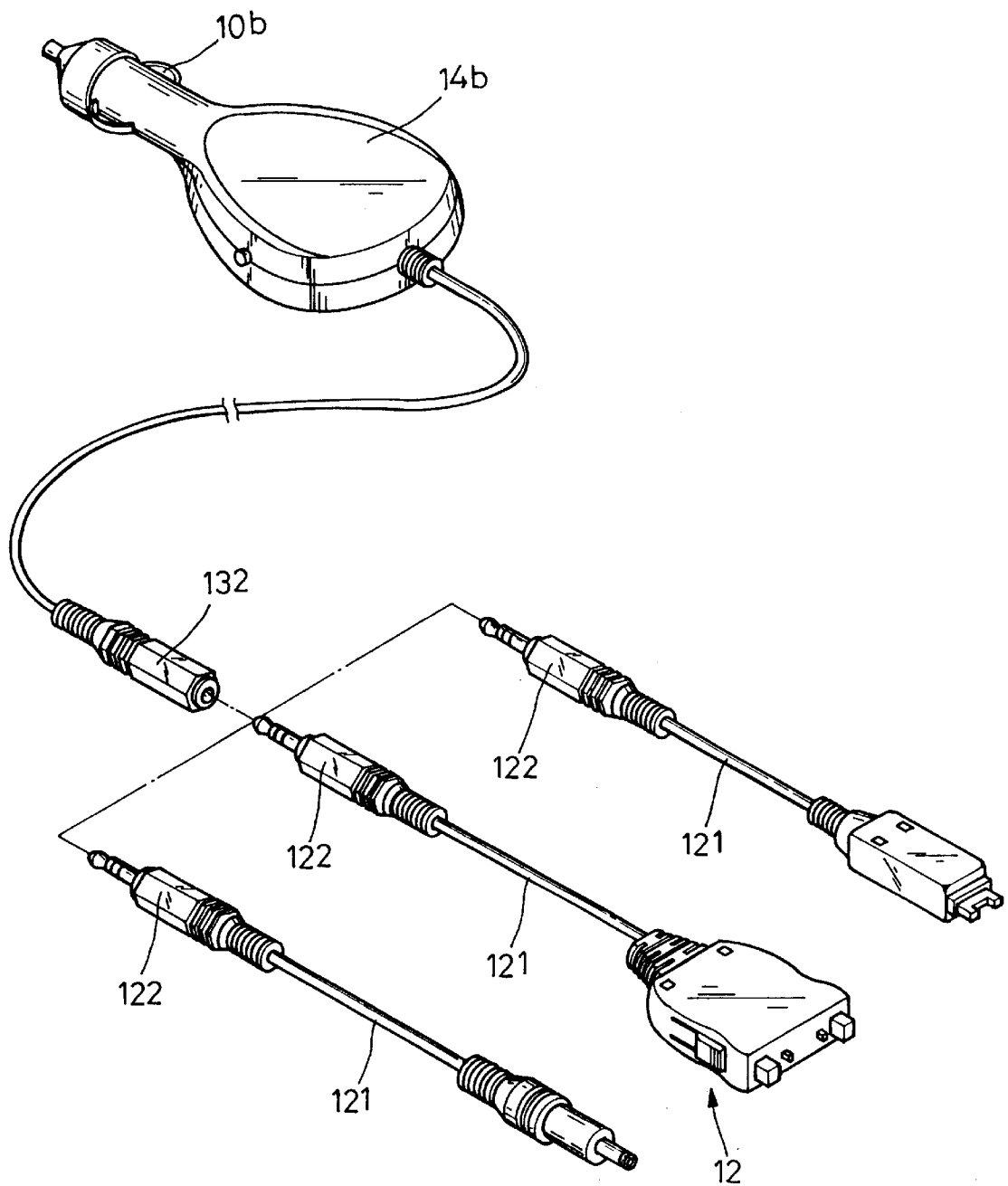
F I G. 2

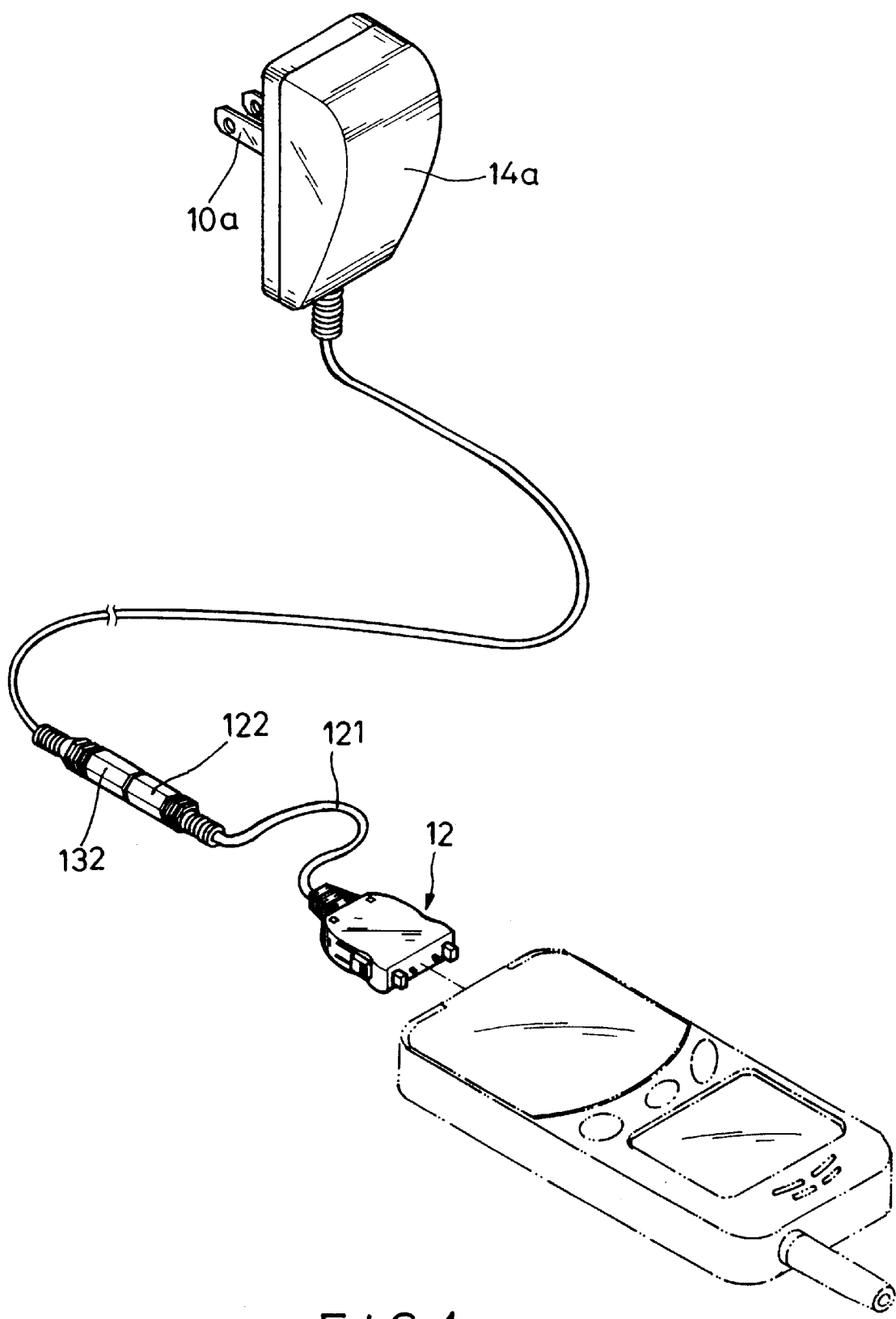
F I G. 4

UNIVERSAL POWER ADAPTER

BACKGROUND OF THE INVENTION

1. Field of the Invention

The present invention relates to a power adapter and, more particularly to a universal power adapter, which is selectively provided with one of a set of charging terminals to fit different voltage charging requirements.

2. Description of the Related Art

Following fast development of photoelectric, communication, and digital technology, a variety of sophisticate electronic products, such as PDAs, digital cameras, mini diskdrives, game machines, mobile phones, etc. have been disclosed and are commercially available. These portable electronic apparatus commonly use a battery to provide the necessary working voltage. However, when battery low, the battery must be recharged to the saturated status for continuous use. However, different battery chargers may have to be used to charge different mobile electronic apparatus subject to different voltage requirements. For example, the charging voltages of the mobile phones of Motorola, Nokia, Ericsson, Panasonic, etc., are different. Some need direct current of 4.2V, and some others need 4.5V. And the other products like PDAs or digital cameras have the same problem as well.

When one goes outside on business or trip, one may have to carry different battery chargers and transformers to fit different personal portable electronic apparatus.

SUMMARY OF THE INVENTION

The present invention has been accomplished under the circumstances in view. It is one object of the present invention to provide a universal power adapter, which selectively provides different output voltages to fit different voltage requirements. It is another object of the present invention to provide a universal power adapter, which is compact and highly mobile. To achieve these and other objects of the present invention, the universal power adapter comprises a power input connector, and a charging connector. The power input connector comprises a voltage regulator adapted to automatically regulate the voltage of input current. The voltage regulator comprises a power/signal jack for connection to the charging connector, a DC voltage converter adapted to convert input current into the desired voltage level and then transmit the voltage-converted input current to the power/signal jack, and a feedback control voltage output circuit adapted to drive the DC voltage converter to output a predetermined voltage subject to compare the feedback voltage signal obtained from the power/signal jack. The charging connector comprises a power/signal connecting connector at one end of the power cord thereof for connection to the power/signal jack and a voltage parameter preset therein.

BRIEF DESCRIPTION OF THE DRAWINGS

FIG. 2 illustrates an alternate form of the universal power adapter according to the present invention.

FIG. 4 shows one application example of the present invention.

DETAILED DESCRIPTION OF THE PREFERRED EMBODIMENT

Figure 1:
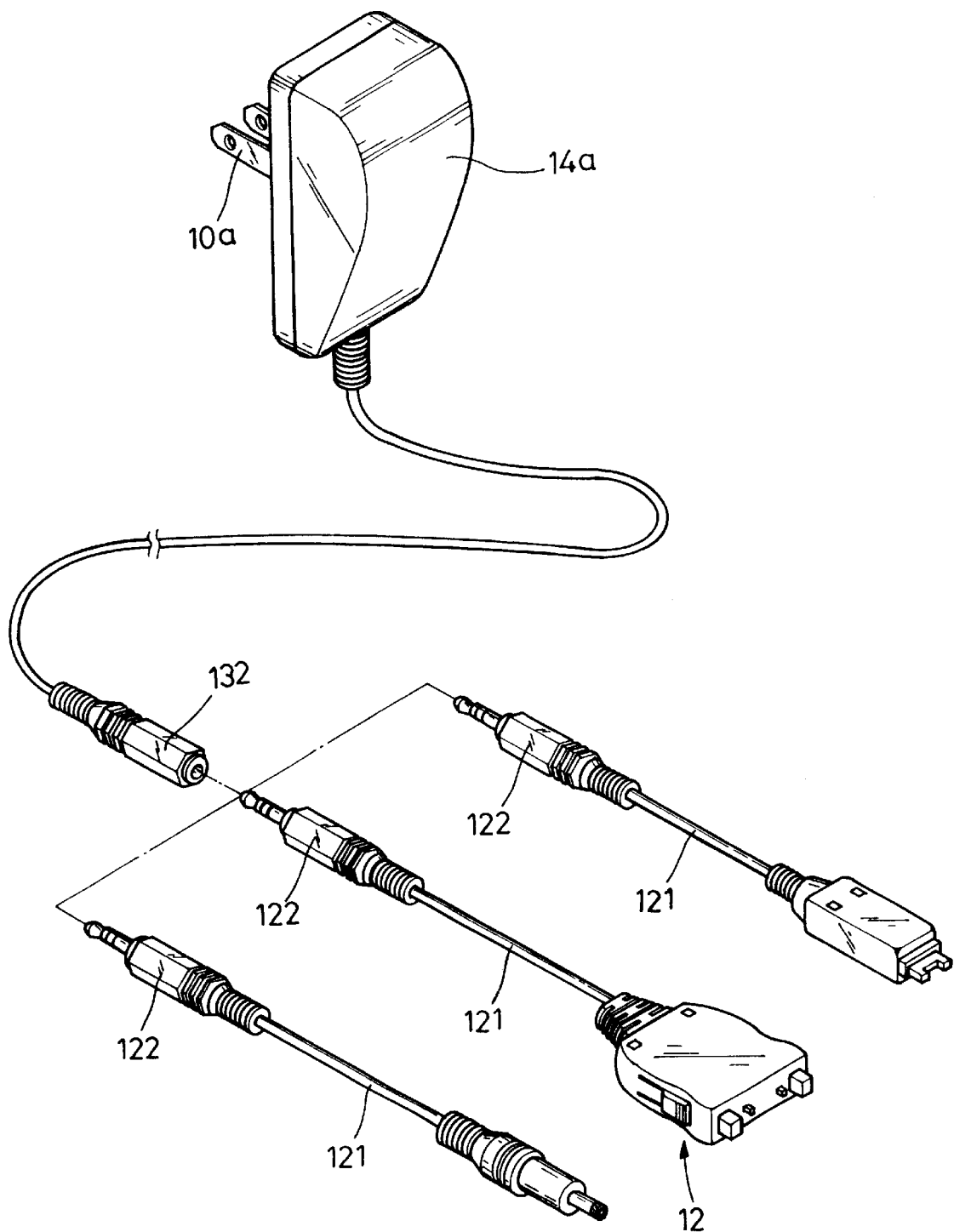
FIG. 1 illustrates a universal power adapter according to the present invention.
Figure 3:
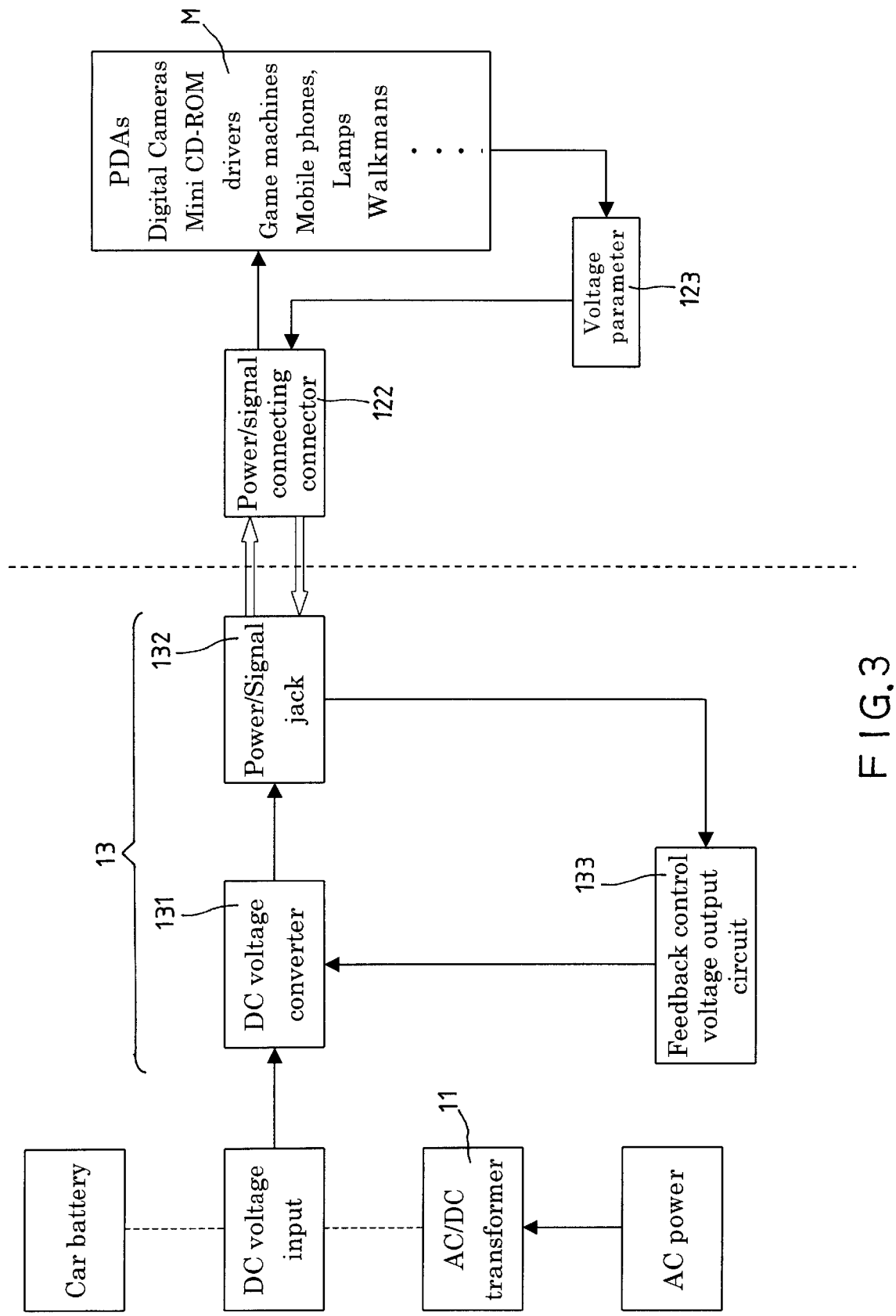
FIG. 3 is a system block diagram of the present invention.
Figure 5:
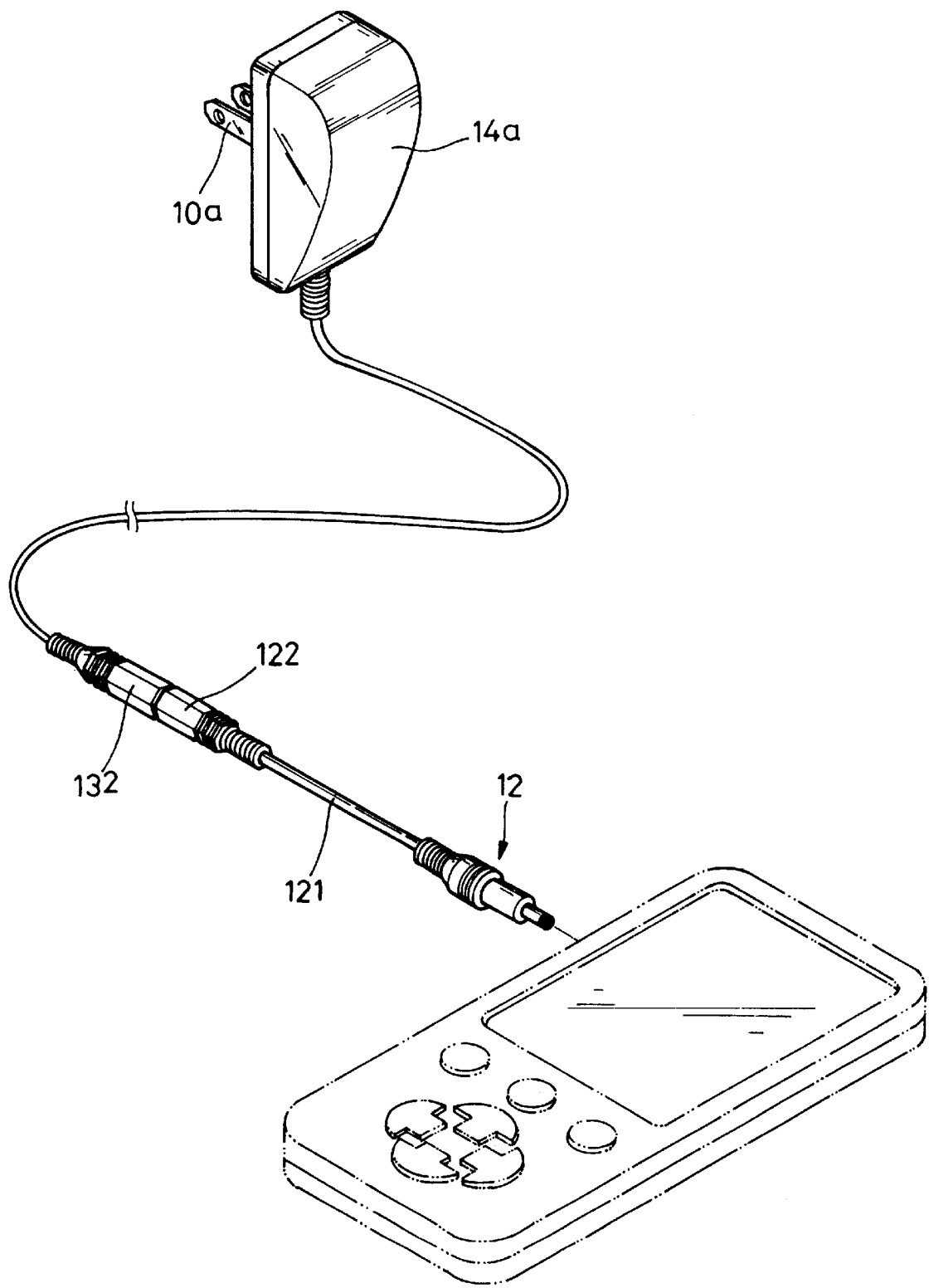
FIG. 5 shows another application example of the present invention.

Referring to FIGS. from 1 through 3, a universal power adapter in accordance with one embodiment of the present invention is shown comprised of a power input connector 10a or 10b, and a charging connector 12. The power input connector 10a shown in FIG. 1 is connectable to AC power source, having an AC/DC transformer 11 adapted to convert AC power supply into DC power supply. The power input connector 10b shown in FIG. 2 is connectable to the socket for cigarette lighter of a car to obtain car battery power from the car. The charging connector 12 may be various embodied to fit different electronic apparatus (see FIGS. 4 and 5). FIG. 1 shows three different forms of the charging connector 12.

The main features of the present invention are outlined hereinafter. The power input connector 10a or 10b comprises a voltage regulator 13 adapted to automatically regulate the voltage of input current. The voltage regulator 13 comprises a power/signal jack 132 for connection to the charging connector 12, a DC voltage converter 131 adapted to convert input current into the desired voltage level and then transmit it to the power/signal jack 132, and a feedback control voltage output circuit 133 adapted to compare feedback voltage signal obtained from the power/signal jack 132 and to drive the DC voltage converter 131 to output a predetermined voltage subject to the comparison result.

The charging connector 12 comprises a power cord 121, a power/signal connecting connector 122 provided at one end of the power cord 121 for connection to the power/signal jack 132 of the voltage regulator 13, and a required voltage parameter 123 preset therein.

In the embodiment shown in FIG. 1, the power input connector 10a, the AC/DC transformer 11, and the DC voltage converter 131 and feedback control voltage output circuit 133 of the voltage regulator 13 are installed in a shell 14a. In the embodiment shown in FIG. 2, the power input connector 10b and the DC voltage converter 131 and feedback control voltage output circuit 133 of the voltage regulator 13 are installed in a shell 14b.

Figure 6:
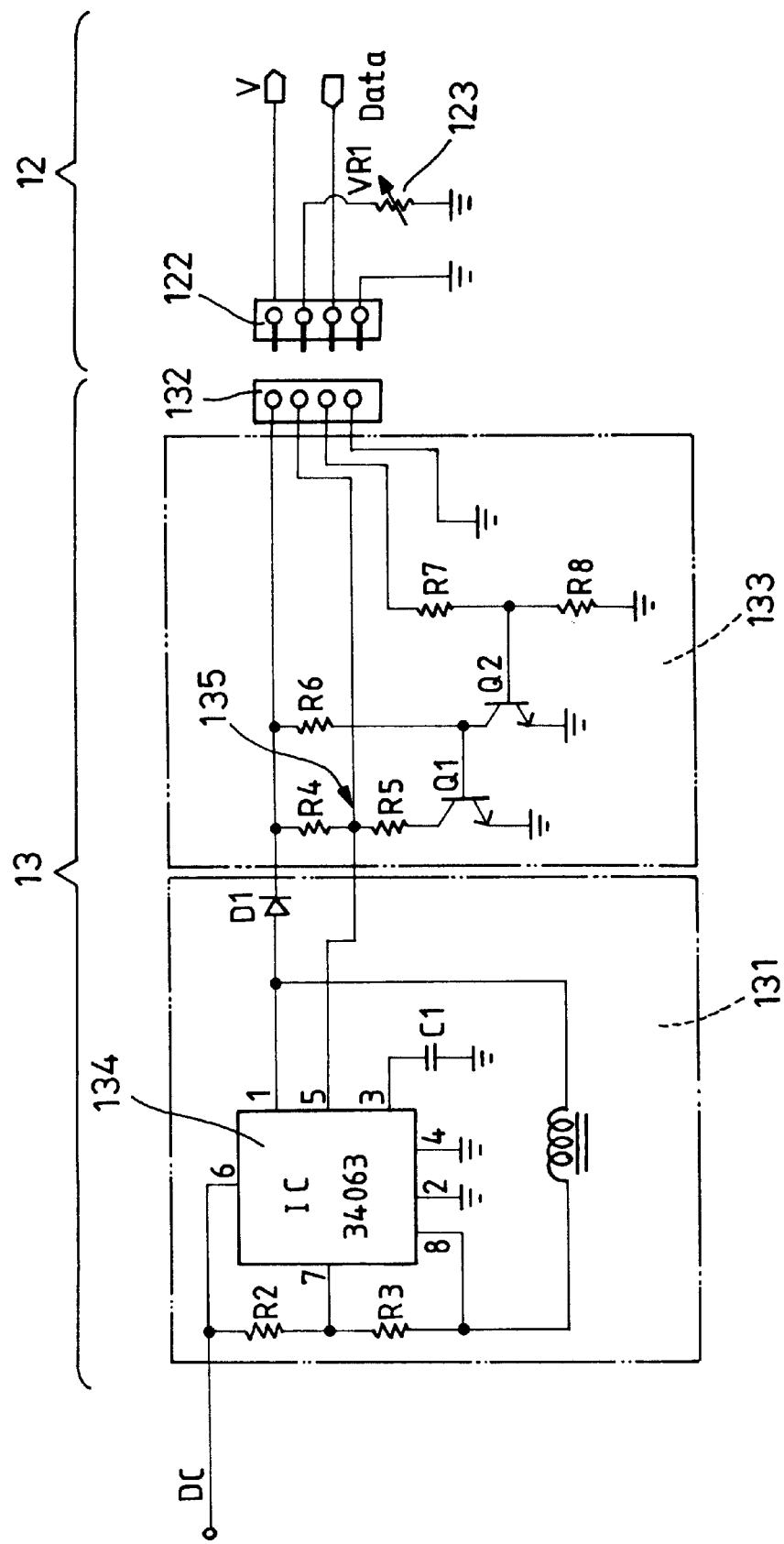
FIG. 6 is a detailed circuit diagram of the present invention.

Referring to FIG. 6, the DC voltage converter 131 of the voltage regulator 13 regulates inputted DC current from the power input connector 10a or 10b into the desired output voltage. The DC voltage converter 131 comprises a voltage stabilizing IC of model 34063 134, which has its sixth pin connected to the power input connector 10a or 10b and its first and fifth pins connected to the power/signal jack 132, and a current-limiter and oscillator circuit connected to the voltage stabilizing IC 134. The current-limiter and oscillator circuit is formed of an inductor L1, a capacitor C1, two resistors R2;R3, and a diode D1.

The feedback control voltage output circuit 133 is connected between the DC voltage transformer 131 and the output power/signal jack 132, comprising two power transistors Q1;Q2 and four resistors R4~R8. Resistors R4;R5 form a voltage shunt point 135 that controls output voltage. The charging connector 12 uses a variable resistor VR1 to provide the necessary voltage parameter 123. When the power/signal connecting connector 122 and the power/signal jack 132 electrically connected, the charging connector 12 feeds back the required voltage parameter 123 through the shunt point 135 of the resistors R4;R5 to the voltage stabilizing IC 134 via the fifth contact point, causing the voltage stabilizing IC 134 to control the inductor L1 to regulate the output voltage to the power/signal connecting connector 122 subject to the rated voltage value of the electronic apparatus to be charged.

As indicated above, the present invention achieves the following advantages:

1. The voltage inputted through the power input connector 10a or 10b is transmitted through the voltage regulator 13 to the charging connector 12, and then the charging connector 12 provides voltage feedback parameter for controlling the output voltage to the product to be charged M, enabling the product M to obtain the optimum charging voltage. Therefore, the universal power adapter of the invention provides high charging efficiency, and long service life.

2. It is not necessary to change the specification of the power input connector 10a or 10b and the composition of the voltage regulator 13 when charging a different product. Different charging connectors 121 can be alternatively used to fit different products. For example, if the mobile phone needs the charging voltage of 4.2V, the variable resistor VR1 of the charging connector 12 will provides the preset voltage parameter 123, enabling the voltage regulator 13 to output 4.2V DC voltage. Accordingly, when the user has different products such as mobile phone, PDA, digital camera, etc., one universal power adapter is sufficient for charging all the products.

A prototype of universal power adapter has been constructed with the features of the annexed drawings of FIGS. 1~6. The universal power adapter functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An universal power adapter comprising:

a power input connector adapted for connecting to power source for DC input; and a charging connector adapted for connecting said power input connector to the product to be charged;

wherein said power input connector comprises a voltage regulator adapted to automatically regulate the voltage of input current, said voltage regulator comprising a power/signal jack for connection to said charging connector, a DC voltage converter adapted to convert input current into the desired voltage level and then transmit the voltage-converted input current to said power/signal jack, and a feedback control voltage output circuit adapted to compare feedback voltage signal obtained from said power/signal jack and to drive said DC voltage converter to output a predetermined voltage subject to the comparison result;

said charging connector comprises a power cord, a power/signal connecting connector provided at one end of said power cord for connection to said power/signal jack of said voltage regulator, and a voltage parameter preset therein.

* * * * *